United States Patent [19]

Jeffrey et al.

[11] Patent Number: 4,751,086
[45] Date of Patent: Jun. 14, 1988

[54] ALUMINUM ANODE ALLOY

[75] Inventors: Paul W. Jeffrey; Wojciech Halliop; Frank N. Smith, all of Kingston, Canada

[73] Assignee: Alcan International Limited, Montreal, Canada

[21] Appl. No.: 888,779

[22] Filed: Jul. 22, 1986

[30] Foreign Application Priority Data

Jul. 26, 1985 [CA] Canada ................................. 487563
May 30, 1986 [CA] Canada ................................. 510488

[51] Int. Cl.$^4$ ...................... H01M 4/58; H01M 4/88; C22C 21/00
[52] U.S. Cl. ................................. 429/218; 252/182.1; 420/528; 420/542
[58] Field of Search ................ 429/218; 420/528, 542; 252/182.1

[56] References Cited

U.S. PATENT DOCUMENTS

| | | | |
|---|---|---|---|
| 2,464,821 | 3/1949 | Ludwick et al. | 420/528 X |
| 3,379,636 | 4/1968 | Reding et al. | 420/528 X |
| 3,830,635 | 8/1974 | Chia et al. | 420/542 X |
| 4,098,606 | 7/1978 | Despic et al. | 420/528 |

FOREIGN PATENT DOCUMENTS

| | | | |
|---|---|---|---|
| 57-12754 | 1/1982 | Japan | 420/542 |
| 60-86760 | 5/1985 | Japan | 420/542 |

Primary Examiner—Brian E. Hearn
Assistant Examiner—Stephen J. Kalafut
Attorney, Agent, or Firm—Cooper & Dunham

[57] ABSTRACT

An electrochemically active aluminum alloy is described which consists essentially of 0.01 to 0.20 percent by weight of indium, at least one of 0.01 to 0.25 percent by weight of manganese and 0.01 to 1.5 percent by weight magnesium, and the balance being aluminum preferably having a purity of at least 99.99 percent by weight. The alloy may contain up to 0.03 percent by weight of iron and preferably contains both manganese and magnesium. It is particularly useful as a battery anode with alkaline electrolytes.

7 Claims, No Drawings

ALUMINUM ANODE ALLOY

BACKGROUND OF THE INVENTION

This invention relates to anodes for electrochemical cells and, more particularly, to an aluminum alloy anode having high energy and high electrochemical potential in cells using strong alkaline solutions.

The basic requirement of a satisfactory anode for electrochemical cells, such as aluminum-air cells, is the ability to generate a high cell voltage while suffering little parasitic corrosion. High voltage is essential as it allows reduction of the number of cells required to construct a battery of a given voltage. Low parasitic corrosion, or in other words high efficiency, leads to higher energy density, i.e. lower anode costs and, more importantly, to minimized hydrogen gas evolution. If this hydrogen gas is not adequately vented and diluted, it is a possible explosion hazard. Furthermore, the venting operation itself potentially raises problems with sealing of the batteries to prevent spillage.

Much previous research has relied upon the addition of stannate to alkaline electrolyte in order to control the parasitic corrosion occuring at the aluminum anodes. One preferred electrolyte that has been used consists of 4 molar sodium hydroxide, 1 molar dissolved aluminium and 0.06 molar sodium stannate (corrosion inhibitor). Nevertheless, there are a number of drawbacks to the use of such an electrolyte, these being:

1. There is a tendency for tin to plate from the electrolyte onto the anode and thereby form a dendritic structure which ultimately shorts the cell;
2. As the tin plates, its concentration in solution decreases with the result that the inhibiting influence of the tin is progressively lost;
3. There is a retardation of growth of aluminum hydroxide crystals in the presence of stannate and this results in the reduction of the efficiency of any regenerative crystallizer unit.

Many studies have also been conducted on the composition of the anode. For instance, Pryor, et al, U.S. Pat. No. 3,189,486 describes an anode consisting essentially of aluminum and tin, optionally with indium. The beneficial effects of gallium, indium and phosphorous upon electrochemical activity are described in Despic, et al, U.S. Pat. No. 4,288,500. When added to super purity aluminum, these elements raise the anodic potentials.

Moden, et al, U.S. Pat. No. 4,107,406 describes an anode made of super purity aluminum containing small amounts of magnesium and gallium.

However, none of the alloys disclosed above provide acceptable performance when used with a strongly alkaline electrolyte without corrosion inhibitor.

SUMMARY OF THE INVENTION

According to the present invention a particularly favourable balance of potential and corrosion resistance in an alkaline electrolyte is obtained when the anode is made of an aluminum based alloy with specific small additions of indium and at least one of manganese and magnesium. In particular, the alloy of the invention consists essentially of 0.01 to 0.20% by weight indium, at least one of 0.01 to 0.25% by weight of manganese and 0.01 to 1.5% by weight magnesium and the balance aluminum, e.g., an aluminum having at least 99.95% and preferably at least 99.99% purity. An anode made from the alloy of the present invention is particularly advantageous for use with a strong alkaline electrolyte, providing an excellent balance of potential and corrosion resistance without the necessity of adding sodium stannate.

DESCRIPTION OF THE PREFERRED EMBODIMENTS

It has been found that the presence of manganese in the alloy is important in order to minimize corrosion under load conditions, while the presence of magnesium is advantageous for minimizing corrosion under no-load conditions. Accordingly, the presence of both manganese and magnesium is preferred.

The alloy may also tolerate the presence of iron in amounts up to about 0.03% by weight without leading to excessively high corrosion. Other components that may be present in the alloy include silicon, tin, titanium and gallium.

A preferred alloy contains 0.05 to 1.0% by weight of magnesium, 0.02 to 0.15% by weight of indium, 0.02 to 0.2% by weight of manganese and the balance of super purity aluminum. This alloy may also contain other minor components such as up to 0.005% by weight silicon, up to 0.005% by weight tin, up to 0.005% by weight titanium and 0.005% by weight gallium. These components, as well as iron, may either be already present in the super purity base aluminum or introduced as impurities with the alloying additions.

The alloy composition can be prepared by a number of conventional casting procedures, including laboratory permanent moulds, twin roll or twin belt casters and the common direct chill methods. An important feature of the invention is to ensure that a minimum level of the alloying constituents are in solution to at least a significant extent. Accordingly, the procedure can include a solution heat treatment either at the ingot or intermediate thickness stage. This can be achieved by heat treatment for 8 hours at 600° C. followed by a water quench. The sheet can be either hot or cold worked, but care must be exercised if hot working or intermediate annealing is used due to the possibility of precipitating the alloying elements by prolonged exposure to temperatures below solution temperature. The presence of precipitated alloying elements in the microstructure can decrease the efficiency of the anode.

Certain preferred embodiments of the invention will now be illustrated by the following examples.

EXAMPLE 1

A series of alloys were prepared starting with super purity aluminum (at least 99.990% purity) and various alloying elements were added as indicated in Table 1. The alloys 1-8 were cast into ingots having a thickness of 19 mm and the ingots were scalped to remove approximately 0.15 mm from each major face. These articles were subjected to solution heat treatment for 8 hours at 600° C. and, following a water quench, were cold rolled to form sheets having a thickness of 3.2 mm. Alloys 9-14 were processed in the same manner with the inclusion of an additional cold rolling operation to 14 mm following scalping but prior to solution heat treatment. This additional operation has no measurable effect on the properties listed in Table 1.

The alloy sheets thus formed were tested as anodes for their ability to generate cell voltages on open circuit and with external currents of 200 and 600 mA/cm$^2$ (respectively EOC, E200, E600) at 60° C. in 4 molar NaOH. Corrosion currents measured as weight loss at open circuit and with external currents of 200 and 600 mA/cm$^2$ (respectively ICOC, IC200, IC600) were also determined.

The alloy compositions and the electrolytic results are shown in Table 1 below.

TABLE 1

| Alloy No. | Alloying Elements - % | | | | Corrosion Currents (mA/cm$^2$) | | | Polarization Data[1] (−V) | | |
|---|---|---|---|---|---|---|---|---|---|---|
| | Mn | Mg | In | Other | ICOC | IC200 | IC600 | EOC | E200 | E600 |
| 1 | | | | | 253 | 104 | passive | 1.56 | 1.50 | passive |
| 2 | .15 | | | | 61 | 165 | passive | 1.69 | 1.52 | 1.25 |
| 3[2] | | .81 | | | >5000 | >5000 | >5000 | — | — | — |
| 4 | | | .11 | | 18 | 210 | 431 | 1.67 | 1.67 | 1.62 |
| 5[2] | .14 | .84 | | | >5000 | >5000 | >5000 | — | — | — |
| 6 | .12 | | .11 | | 54 | 33 | 83 | 1.76 | 1.79 | 1.58 |
| 7 | | .80 | .097 | | 10 | 30 | 87 | 1.70 | 1.70 | 1.59 |
| 8 | .13 | .84 | .11 | | 14 | 19 | 70 | 1.70 | 1.69 | 1.64 |
| 8[3] | | | | | 9 | — | — | 1.78 | — | — |
| 9 | | | | .04 Fe | 479 | 303 | 208 | 1.45 | 1.39 | 1.34 |
| 10 | | | | .04 Ga | >5000 | >5000 | >5000 | 1.85 | — | — |
| 11 | | | | .11 Sn | 198 | 10 | 12 | 1.56 | 1.56 | 1.52 |
| 12 | | .80 | | .04 Ga | >5000 | >5000 | >5000 | 1.87 | 1.73 | 1.65 |
| 13 | | .40 | | .04 Ga .10 Sn | 102 | 32 | 1 | 1.73 | 1.63 | 1.63 |
| 14 | | | | 4.73 Zn | 510 | — | — | 1.74 | — | — |

[1]Potential vs. Hg/HgO reference electrode - IR corrected
[2]Potentials not measured as alloy considered impractical due to high corrosion
[3]Electrolyte contained 27 g/l dissolved alloy From the above table it is evident that the binary alloys were quite inadequate. From Table 1 it will also be seen that in terms of high potentials and low corrosion currents, the ternary and quaternary alloys containing Mn, Mg, and In provide the most useful compromise of any of the alloys tested. It is also clear that the build up of dissolved alloy in the electrolyte, for example, as represented by the testing of alloy 8 in the electrolyte with 27 g/l of dissolved alloy, does not adversely affect the behaviour.

EXAMPLE 2

To demonstrate the effect of manganese on the corrosion rate under load of the alloy of the invention, eight different alloys were prepared starting with super purity aluminum (at least 99.990% purity). These were cast containing two different concentrations of magnesium and indium and with and without manganese, using the same procedure as was used for alloys 1-8 of Example 1. The corrosion at a load of 200 mA/cm$^2$ was measured as in Example 1, all measurements being taken three times, and the mean recorded. The results are shown in Table 2 below:

TABLE 2

| Alloy No. | Alloying Elements - % | | | IC200 (mA/cm$^2$) (mean) | Std. Dev. |
|---|---|---|---|---|---|
| | Mg | Mn | In | | |
| 15 | .1 | Nil | .02 | 37 | 2.3 |
| 16 | .4 | Nil | .02 | 31 | 3.9 |
| 17 | .1 | .03 | .02 | 22 | 4.7 |
| 18 | .4 | .03 | .02 | 26 | 1.7 |
| 19 | .1 | Nil | .05 | 30 | 1.3 |
| 20 | .4 | Nil | .05 | 31 | 3.9 |
| 21 | .1 | .03 | .05 | 13 | 3.6 |
| 22 | .4 | .03 | .05 | 17 | 1.3 |

It will be seen from the above results that the quarternary alloys possess the lowest corrosion rate.

EXAMPLE 3

In order to determine the effects of contaminants on alloys of the invention, a series of aluminum alloys were cast from super purity aluminum base containing varying concentrations of iron and silicon, together with relatively low concentrations of magnesium, manganese and indium. A high purity base and a commercial purity base were also used. The procedure used was the same as that used for alloys 1-8 of Example 1.

The alloy compositions and the results, measured as in Example 1, are shown in Table 3 below:

TABLE 3

| Alloy No. | Alloy Base | Alloying Elements - % | | | | | ICOC (mA/cm$^2$) | IC200 (mA/cm$^2$) | EOC (−V) | E200 (−V) |
|---|---|---|---|---|---|---|---|---|---|---|
| | | Fe | Si | Mg | Mn | In | | | | |
| 23 | Super Purity | 0.011 | 0.001 | 0.432 | 0.037 | 0.051 | 17.07 | 19.73 | 1.760 | 1.66 |
| 24 | Super Purity | 0.020 | 0.001 | 0.837 | 0.165 | 0.10 | 12.21 | 18.47 | 1.823 | 1.80 |
| 25 | Super Purity | 0.039 | 0.004 | 0.430 | 0.037 | 0.050 | 15.94 | 370.88 | 1.763 | 1.6 |
| 26 | Super Purity | 0.088 | 0.018 | 0.428 | 0.037 | 0.049 | 2112.03 | 2033.80 | 1.640 | 1.44 |
| 27 | High Purity | 0.024 | 0.022 | 0.454 | 0.014 | 0.051 | 131.91 | 116.21 | 1.681 | 1.4 |
| 28 | Commercial Purity | 0.056 | 0.031 | 0.415 | 0.024 | 0.049 | 919.47 | 481.44 | 1.636 | 1.30 |

We claim:

1. Electrochemically active aluminum alloy consisting essentially of 0.01 to 0.20 percent by weight of indium, 0.01 to 0.25 percent by weight of manganese and 0.01 to 1.5 percent by weight of magnesium and the balance of aluminum having a purity of at least 99.95 percent.

2. An alloy according to claim 1 wherein the aluminum has a purity of at least 99.99 percent.

3. Electrochemically active aluminum alloy consisting essentially of 0.01 to 0.20 percent by weight of indium, 0.01 to 0.25 percent by weight of manganese and the balance of aluminum having a purity of at least 99.95 percent.

4. An alloy according to claim 1 containing iron in an amount up to 0.03 percent by weight.

5. Electrochemically active aluminum alloy consisting essentially of 0.02 to 0.15 percent by weight indium, 0.05 to 1.0 percent by weight of magnesium, 0.02 to 0.2 percent by weight manganese and the balance of aluminum having a purity of at least 99.990 percent.

6. An alloy according to claim 1 which has been solution heat treated.

7. An anode for a primary electrochemical energy source formed from the aluminum alloy claimed in claim 1.

* * * * *